United States Patent
Chang et al.

(10) Patent No.: US 12,485,410 B1
(45) Date of Patent: Dec. 2, 2025

(54) POROUS CARBON CATALYST LOADED WITH METAL SULFIDES BASED ON HIGH-SULFUR PETROLEUM COKE AND PREPARATION METHOD THEREFOR AND APPLICATION THEREOF

(71) Applicants: SHANDONG UNIVERSITY, Shandong (CN); QINGDA LOW CARBON GREEN HYDROGEN INDUSTRIAL TECHNOLOGY RESEARCH INSTITUTE (QINGDAO) CO., LTD., Shandong (CN)

(72) Inventors: Jingcai Chang, Qingdao (CN); Yulin Huang, Qingdao (CN); Xin'an Zhang, Qingdao (CN); Lianhai Zhang, Qingdao (CN); Yong Shi, Qingdao (CN); Haoran Wu, Qingdao (CN); Yifan Li, Qingdao (CN); Yiming Wang, Qingdao (CN); Jiahao Zhang, Qingdao (CN); Taiyang Liu, Qingdao (CN); Yang Zhang, Qingdao (CN); Chen Huang, Qingdao (CN)

(73) Assignees: SHANDONG UNIVERSITY, Shandong (CN); QINGDA LOW CARBON GREEN HYDROGEN INDUSTRIAL TECHNOLOGY RESEARCH INSTITUTE (QINGDAO) CO., LTD., Shandong (CN)

(*) Notice: Subject to any disclaimer, the term of this patent is extended or adjusted under 35 U.S.C. 154(b) by 0 days.

(21) Appl. No.: 18/928,876

(22) Filed: Oct. 28, 2024

(30) Foreign Application Priority Data

Jun. 3, 2024  (CN) .......................... 202410705034.4

(51) Int. Cl.
 B01J 37/20 (2006.01)
 B01J 27/04 (2006.01)
 (Continued)

(52) U.S. Cl.
 CPC ............... B01J 37/20 (2013.01); B01J 27/04 (2013.01); B01J 27/043 (2013.01);
 (Continued)

(58) Field of Classification Search
 CPC . B01J 27/04; B01J 27/043; B01J 37/04; B01J 37/06; B01J 37/08; B01J 37/20
 See application file for complete search history.

(56) References Cited

U.S. PATENT DOCUMENTS 4,082,694 A * 4/1978 Wennerberg .......... C01B 32/342
 428/408
4,513,096 A   4/1985 Connolly et al.

FOREIGN PATENT DOCUMENTS

CN   107051391 A     8/2017
CN   108641776 A  * 10/2018 ................ C10L 9/02
(Continued)

OTHER PUBLICATIONS

Machine translation of Chang et al. (CN118268005), pulication date Jul. 2, 2024.*

(Continued)

Primary Examiner — Jun Li
(74) Attorney, Agent, or Firm — Oliff PLC (57) ABSTRACT

The present invention provides a porous carbon catalyst loaded with metal sulfides based on high-sulfur petroleum coke and preparation method therefor and application thereof. The method includes the steps of preparing an in-situ activated precursor from a pre-treated high-sulfur petroleum coke, destabilizing bulk sulfur, conducting an in-situ metal-sulfur bonding reaction, and washing and (Continued)

drying, which achieve the high-value in-situ conversion of sulfur in high-sulfur petroleum coke, resulting in the preparation of a porous carbon catalyst loaded with metal sulfides based on high-sulfur petroleum coke. This catalyst is applied to catalyze magnesium-based hydrogen storage materials. It not only avoids the discharge of sulfur-containing gas or sulfur-containing wastewater in the conventional utilization route of high-sulfur petroleum coke, but also expands the green multi-scenario utilization route of high-sulfur petroleum coke to promote the synergy of pollution reduction and carbon reduction in the petroleum refining industry.

5 Claims, 6 Drawing Sheets

(51) Int. Cl.
      *B01J 27/043*     (2006.01)
      *B01J 37/00*     (2006.01)
      *B01J 37/04*     (2006.01)
      *B01J 37/06*     (2006.01)
      *B01J 37/08*     (2006.01)
      *C01B 3/04*     (2006.01)

(52) U.S. Cl.
      CPC ............ *B01J 37/0036* (2013.01); *B01J 37/04* (2013.01); *B01J 37/06* (2013.01); *B01J 37/088* (2013.01); *C01B 3/04* (2013.01)

(56) References Cited

FOREIGN PATENT DOCUMENTS

| | | | | |
|---|---|---|---|---|
| CN | 111250092 A | * | 6/2020 | .............. B01J 37/16 |
| CN | 112777564 A | | 5/2021 | |
| CN | 118268005 A | * | 7/2024 | ........... C01B 3/0078 |

OTHER PUBLICATIONS

Hou et al. Fabrication of nickel sulfide/hierarchical porous carbon from refining waste for high-performance supercapacitor, Journal of Alloys and Compounds 937 (2023) 168399.*

Xiao et al., Sulphur retention and in-situ preparation of metal sulphide catalysts during activation of petroleum coke, Chemosphere 308 (2022) 136340.*

Lee et al., Chemical activation of high sulfur petroleum cokes by alkali metal compounds, Fuel Processing Technology 64, 2000. 141-153.*

Shan et al., Insight into transformation of sulfur species during KOH activation of high sulfur petroleum coke, Fuel 215 (2018) 258-265.*

Virla et al., Synthesis of porous carbon from petroleum coke using steam, potassium and sodium: Combining treatments to create mesoporosity, Microporous and Mesoporous Materials 234 (2016) 239e247.*

Qihuang Huo et al. "ZNS/AC Sorbent Derived From the High Sulfur Petroleum Coke for Mercury Removal". Fuel Processing Technology, 2019, vol. 191, pp. 36-43.

* cited by examiner

POROUS CARBON CATALYST LOADED WITH METAL SULFIDES BASED ON HIGH-SULFUR PETROLEUM COKE AND PREPARATION METHOD THEREFOR AND APPLICATION THEREOF

The present invention claims priority to Chinese patent application CN 202410705034.4, filed on Jun. 3, 2024, entitled "porous carbon catalyst loaded with metal sulfides based on high-sulfur petroleum coke and preparation method therefor and application thereof" The entire contents of the aforementioned application are incorporated herein by reference for all purposes.

TECHNICAL FIELD

The present invention relates to the field of resource utilization technology for high-sulfur petroleum coke, specifically providing a porous carbon catalyst loaded with metal sulfides based on high-sulfur petroleum coke and preparation method therefor and application thereof.

BACKGROUND

The statements herein provide only the background technology related to the present invention and do not necessarily constitute prior art.

High-sulfur petroleum coke is an industrial byproduct of the delayed coking process in petrochemical industries. Its high sulfur content (~7 wt %) limits its applicability as a solid fuel, resulting in significant restrictions from production to consumption and a severe oversupply situation. With a high carbon content (~80 wt %) and abundant resources, converting high-sulfur petroleum coke into porous carbon materials for adsorption, catalysis, and other applications via physical or chemical activation methods is a common high-value conversion pathway. However, conventional activation processes often release sulfur, resulting in the discharge of sulfur-containing gases or wastewater, which not only poses potential environmental pollution issues but also wastes sulfur resources. Maximizing the resource utilization and reduction of high-sulfur petroleum coke while expanding its green multi-scenario usage remains a significant challenge.

Magnesium hydride ($MgH_2$) is a solid-state hydrogen storage material with abundant reserves and high hydrogen density, showing great application prospects. However, its high thermodynamic stability ($\Delta H \approx 76$ kJ/mol) and kinetic barrier ($Ea \approx 160.0$ kJ/mol) lead to high hydrogen desorption temperatures and slow kinetics. The addition of catalysts is an important means to improve the hydrogen absorption and desorption performance of magnesium hydride. It has been demonstrated that carbon materials can prevent agglomeration and growth of magnesium particles during hydrogen cycling, enhancing cycling performance. The addition of metal sulfide (TMS) catalysts can form multi-phase catalytic components in situ, improving hydrogen absorption and desorption performance. However, the preparation of commercial carbon materials and metal sulfides is limited by complexity, processing difficulties, and high costs.

SUMMARY

In response to the environmental pollution and resource waste issues associated with conventional utilization pathways for high-sulfur petroleum coke, the objective of the present invention is to provide a porous carbon catalyst loaded with metal sulfides based on high-sulfur petroleum coke, preparation method therefor and application thereof. The present invention uses inexpensive high-sulfur petroleum coke as a raw material to induce in-situ conversion of bulk sulfur (such as thiophene sulfur, sulfone sulfur, etc.) to transition metal sulfides (TMS), preparing a porous carbon catalyst loaded with metal sulfides, which is applied to catalyze magnesium-based hydrogen storage materials. This approach not only avoids the discharge of sulfur-containing gases or wastewater typical of conventional utilization pathways for high-sulfur petroleum coke, but also expands the green multi-scenario utilization pathways for high-sulfur petroleum coke, promoting the petroleum refining industry's synergistic pollution reduction and carbon decrease.

To achieve the aforementioned objectives, the present invention is implemented through the following technical solutions:

according to a first aspect, the present invention provides a method for preparing a porous carbon catalyst loaded with metal sulfides based on high-sulfur petroleum coke, including:

(1) preparing an in-situ activated precursor mixing a pre-treated high-sulfur petroleum coke with transition metal salts in an ethanol aqueous solution thoroughly, and then evaporating to obtain the in-situ activated precursor;

(2) destabilizing bulk sulfur grinding and mixing the in-situ activated precursor obtained from step (1) with an alkaline activator in a certain proportion, followed by placement in a tube furnace, heating from room temperature to a specified temperature at a controlled rate under an argon inert atmosphere, bulk sulfur is destabilized under the combined effect of high temperature and the alkaline activator;

(3) conducting an in-situ metal-sulfur bonding reaction maintaining the high-temperature conditions from step (2), switching the atmosphere to hydrogen, and conducting the in-situ metal-sulfur bonding reaction, followed by cooling down to room temperature under an argon atmosphere;

(4) washing and drying washing the product obtained from step (3) with a washing solution, drying and grinding to obtain the porous carbon catalyst loaded with metal sulfides based on high-sulfur petroleum coke.

In the present invention, "room temperature" refers to a temperature range of 20-30° C.

In some embodiments, a content of sulfur in the high sulfur petroleum coke is 3-10 wt %.

In some embodiments, high-sulfur petroleum coke has a size of 110-125 μm (after screening).

Preferably, the pre-treatment involves ultrasonic washing with deionized water for 30-40 minutes, followed by drying in a drying oven at a temperature of 100-120° C. for 10-12 hours.

In some embodiments, the transition metal salts are selected from at least one of nitrate, sulfate, chloride, and acetate.

Preferably, the corresponding metals of the transition metal salts are selected from at least one of nickel, iron, copper, niobium, molybdenum, titanium, vanadium, and manganese.

Preferably, a mass ratio of the high sulfur petroleum coke to the transition metal salt is 1:(0.1-1).

In some embodiments, a mass ratio of high-sulfur petroleum coke to the ethanol aqueous solution is 1:(30-60); in the ethanol aqueous solution, the volume fraction of ethanol is 40-60%.

In some embodiments, the alkaline activator is potassium hydroxide or sodium hydroxide.

Preferably, a mass ratio of the alkaline activator to high-sulfur petroleum coke is (1-5):(1-2).

In some embodiments, the temperature is raised at a rate of 5-10° C./min to 600-800° C. under a high-purity argon atmosphere, with an argon flow rate of 100-150 mL/min.

In some embodiments, the argon atmosphere is switched to the hydrogen atmosphere during the in-situ metal-sulfur bonding reaction.

Preferably, a flow rate of the hydrogen is 10-60 mL/min, and the reaction time is 1-2 hours.

In some embodiments, the method further includes washing and drying the reaction product, wherein the washing solution is water, a pH of the product after washing is 6.5-7.5, and the drying is carried out at 60-80° C. for 20-24 hours.

According to a second aspect, the present invention provides a porous carbon catalyst loaded with metal sulfides based on high-sulfur petroleum coke, prepared by the method described above.

According to a third aspect, the present invention provides an application of the porous carbon catalyst loaded with metal sulfides based on high-sulfur petroleum coke in catalyzing hydrogen release from $MgH_2$.

A method for catalyzing hydrogen release from $MgH_2$ using the porous carbon catalyst loaded with metal sulfides based on high-sulfur petroleum coke, including mixing and ball-milling the porous carbon catalyst loaded with metal sulfides based on high-sulfur petroleum coke with $MgH_2$ in proportion to obtain a composite magnesium-based hydrogen storage material, referred to as TMS-AC-$MgH_2$; a mass ratio of the porous carbon catalyst loaded with metal sulfides based on high-sulfur petroleum coke to $MgH_2$ is 1:(5-20), a ball-to-material ratio is (30-50):1, the ball-milling is carried out at a speed of 300-500 rpm for 4-6 hours.

The beneficial effects obtained from one or more embodiments of the present invention are as follows:
the present invention utilizes inexpensive high-sulfur petroleum coke as a sulfur-containing high-quality carbon source, converting it into porous carbon materials while simultaneously bonding bulk sulfur atoms with transition metals, achieving in-situ conversion to transition metal sulfides. The method has significant research value and application potential, with a simple, green, and low-cost preparation process that enables high-value in-situ conversion and resource utilization of high-sulfur petroleum coke.

The in-situ conversion of bulk sulfur in high-sulfur petroleum coke to transition metal sulfides achieves a sulfur conversion rate of up to 40.00%, facilitating the resource utilization of sulfur and avoiding potential environmental pollution and resource waste caused by sulfur release in conventional utilization pathways.

Using the method described in the present invention to prepare the porous carbon catalyst loaded with metal sulfides based on high-sulfur petroleum coke expands the pathways for high-value conversion and multi-scenario utilization of high-sulfur petroleum coke, further enabling resource utilization and reduction of high-sulfur petroleum coke.

The method described in the present invention is based on an alkali activation process. The resulting carbon material has a rich porous structure and a large specific surface area, allowing the in-situ converted transition metal sulfides to be uniformly dispersed, thereby exposing more catalytic active sites.

The porous carbon-supported transition metal sulfide catalyst prepared by the method of the present invention is used to catalyze hydrogen release from $MgH_2$, significantly reducing the hydrogen release temperature of $MgH_2$. The peak temperature is reduced by more than 100° C. compared to pure $MgH_2$, demonstrating a remarkable catalytic effect.

BRIEF DESCRIPTION OF THE DRAWINGS

The accompanying drawings to the specification, which form part of the present invention, are used to provide a further understanding of the present invention, and the illustrative examples of the present invention and the description thereof are used to explain the present invention and are not unduly limiting the present invention.

DESCRIPTION OF THE PREFERRED EMBODIMENTS

It should be noted that the following detailed descriptions are all illustrative and intended to provide further clarification of the present invention. Unless otherwise specified, all technical and scientific terms used in the present invention have the same meaning as commonly understood by those of ordinary skill in the art to which the present invention belongs.

The present invention will be further described below in conjunction with the following examples.

The materials used in the examples and comparative examples were commercially available unless otherwise specified.

Example 1

Figure 1:
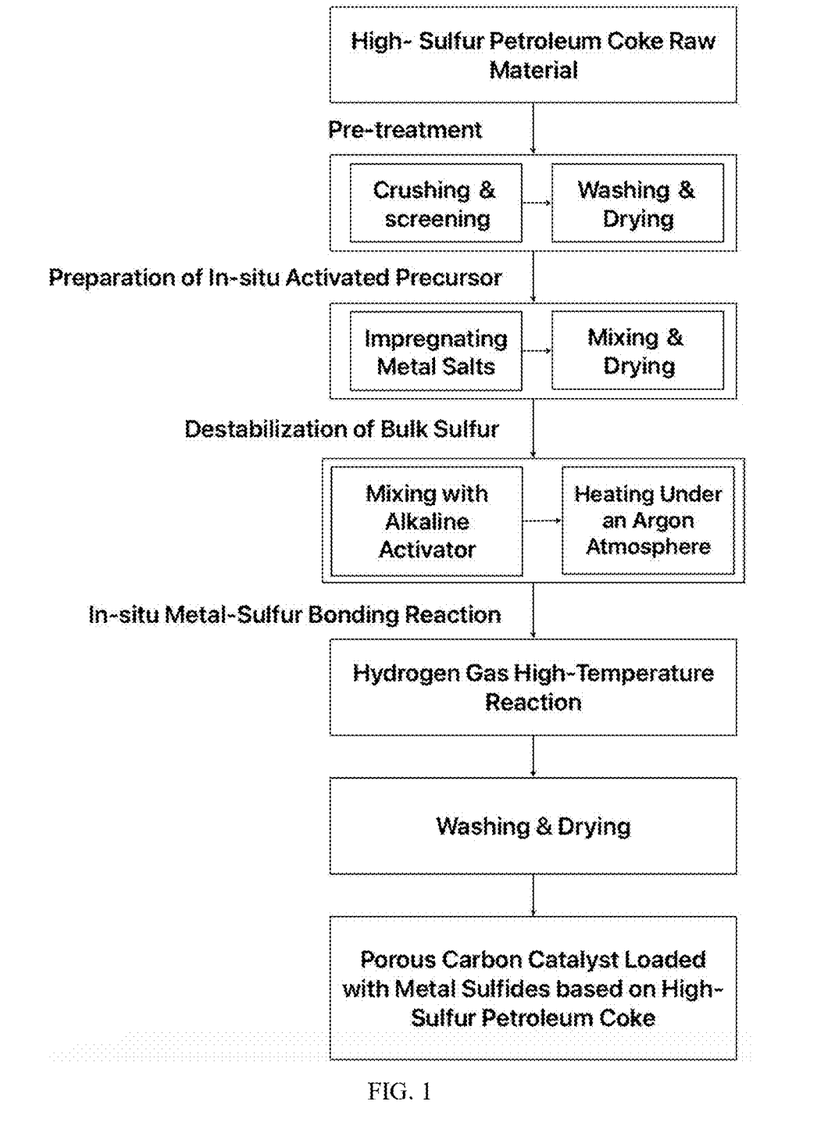
FIG. 1 is a process flow diagram for the preparation method of the porous carbon catalyst loaded with metal sulfides based on high-sulfur petroleum coke, according to the present invention.

A method for preparing a porous carbon catalyst loaded with metal sulfides based on high-sulfur petroleum coke is illustrated in the flowchart shown in FIG. 1. The method included the following steps:

Step 1: Preparation of the In-Situ Activated Precursor (1) 1.5 g of high-sulfur petroleum coke was uniformly dispersed in 75 ml of an ethanol solution with a volume fraction of 50%, and 1.01 g of nickel nitrate hexahydrate was added. The mixture was stirred at room temperature for 2 hours.
(2) After stirring, the high-sulfur petroleum coke-metal salt solution was placed in a drying oven and evaporated at 120° C. for 12 hours to obtain the activated precursor.

Step 2: Destabilization of Bulk Sulfur
(1) The potassium hydroxide and the activated precursor from Step 1 were ground evenly in a mortar at a mass ratio of 1:1 and placed in a nickel crucible.
(2) The nickel crucible was placed in a high-temperature tube furnace. Under a high-purity argon atmosphere, the temperature was increased at a rate of 5° C./min to 800° C.

Step 3: In-Situ Metal-Sulfur Bonding Reaction
(1) Once the temperature reached 800° C., the atmosphere was switched to hydrogen at a flow rate of 25 mL/min.
(2) The reaction was maintained at this temperature for 1 hour to conduct the in-situ metal-sulfur bonding reaction, and then the temperature was reduced to room temperature under an argon atmosphere.

Step 4: Washing and Drying
(1) The sample obtained from Step 3 was washed with deionized water until the pH value reached 7.
(2) The washed sample was dried in a drying oven at 70° C. for 24 hours, yielding a porous carbon catalyst loaded with metal sulfides based on high-sulfur petroleum coke.

Figure 2:
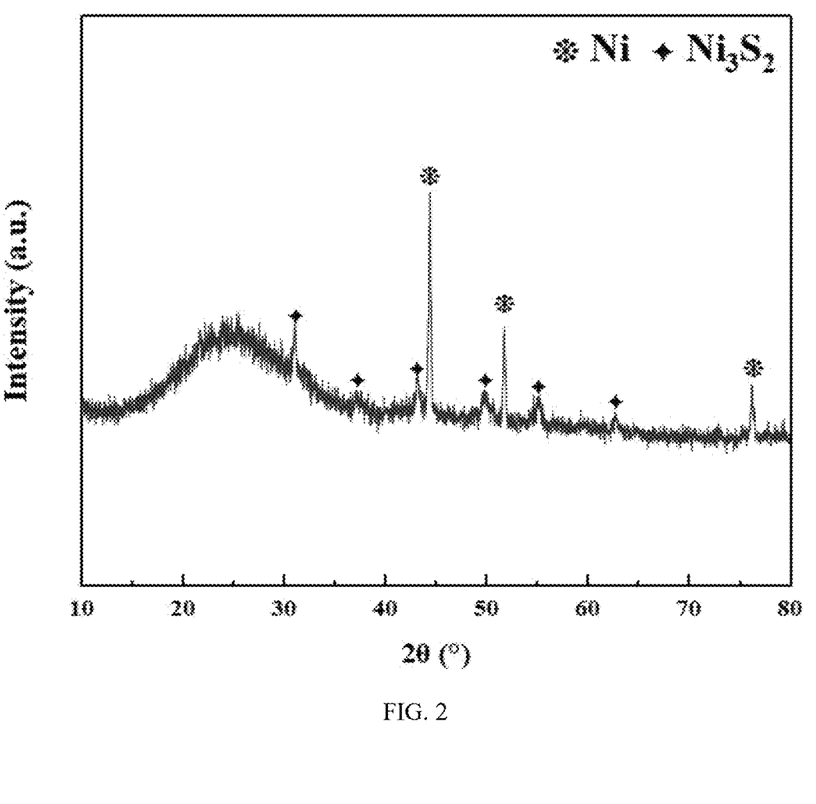
FIG. 2 is X-ray diffraction (XRD) pattern of the porous carbon catalyst loaded with metal sulfides based on high-sulfur petroleum coke prepared in Example 1.

FIG. 2 shows the XRD pattern of the porous carbon catalyst loaded with metal sulfides based on high-sulfur petroleum coke prepared in Example 1, where diffraction peaks corresponding to $Ni_2S_3$ appeared at several positions, confirming the successful formation of the transition metal sulfide. Table 1 shows that the sulfur conversion rate of the porous carbon catalyst loaded with metal sulfides based on high-sulfur petroleum coke was 40%, indicating that the bulk sulfur in high-sulfur petroleum coke was successfully retained and transformed into an effective catalytic component.

Figure 3:
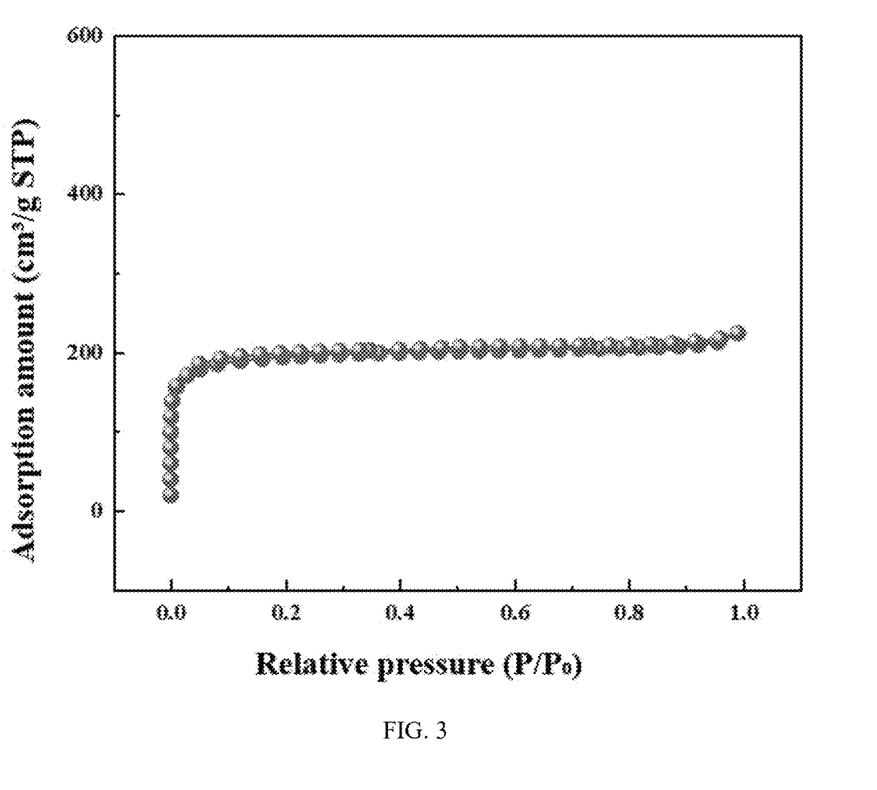
FIG. 3 shows $N_2$ adsorption/desorption isotherms of the porous carbon catalyst loaded with metal sulfides based on high-sulfur petroleum coke prepared in Example 1.

FIG. 3 shows the $N_2$ adsorption/desorption isotherms of the porous carbon catalyst loaded with metal sulfides based on high-sulfur petroleum coke, exhibiting a typical Type I isotherm, with a specific surface area and pore volume of 600.21 $m^2/g$ and 0.347 $cm^2/g$, respectively.

Example 2

The method for preparing the porous carbon catalyst loaded with metal sulfides based on high-sulfur petroleum coke in this example was the same as Example 1, except for Steps 1 and 2.

Step 1: Preparation of the In-Situ Activated Precursor
(1) 1.5 g of high-sulfur petroleum coke was uniformly dispersed in 75 ml of an ethanol solution with a volume fraction of 50%, and 0.93 g of niobium pentachloride was added. The mixture was stirred at room temperature for 2 hours.
(2) After stirring, the high-sulfur petroleum coke-metal salt solution was placed in a drying oven and evaporated at 120° C. for 12 hours to obtain the activated precursor.

Step 2: Destabilization of Bulk Sulfur
(1) The potassium hydroxide and the activated precursor from Step 1 were ground evenly in a mortar at a mass ratio of 2:1 and placed in a nickel crucible.
(2) The nickel crucible was placed in a high-temperature tube furnace. Under a high-purity argon atmosphere, the temperature was increased at a rate of 5° C./min to 800° C.

Example 3

The method for preparing the porous carbon catalyst loaded with metal sulfides based on high-sulfur petroleum coke in this example was the same as Example 1, except for Steps 1 and 2.

Step 1: Preparation of the In-Situ Activated Precursor
(1) 2 g of high-sulfur petroleum coke was uniformly dispersed in 100 ml of an ethanol solution with a volume fraction of 50%, and 1.35 g of nickel nitrate hexahydrate was added. The mixture was stirred at room temperature for 2 hours.
(2) After stirring, the high-sulfur petroleum coke-metal salt solution was placed in a drying oven and evaporated at 120° C. for 12 hours to obtain the activated precursor.

Step 2: Destabilization of Bulk Sulfur
(1) The potassium hydroxide and the activated precursor from Step 1 were ground evenly in a mortar at a mass ratio of 2:1 and placed in a nickel crucible.
(2) The nickel crucible was placed in a high-temperature tube furnace. Under a high-purity argon atmosphere, the temperature was increased at a rate of 5° C./min to 800° C.

Figure 4:
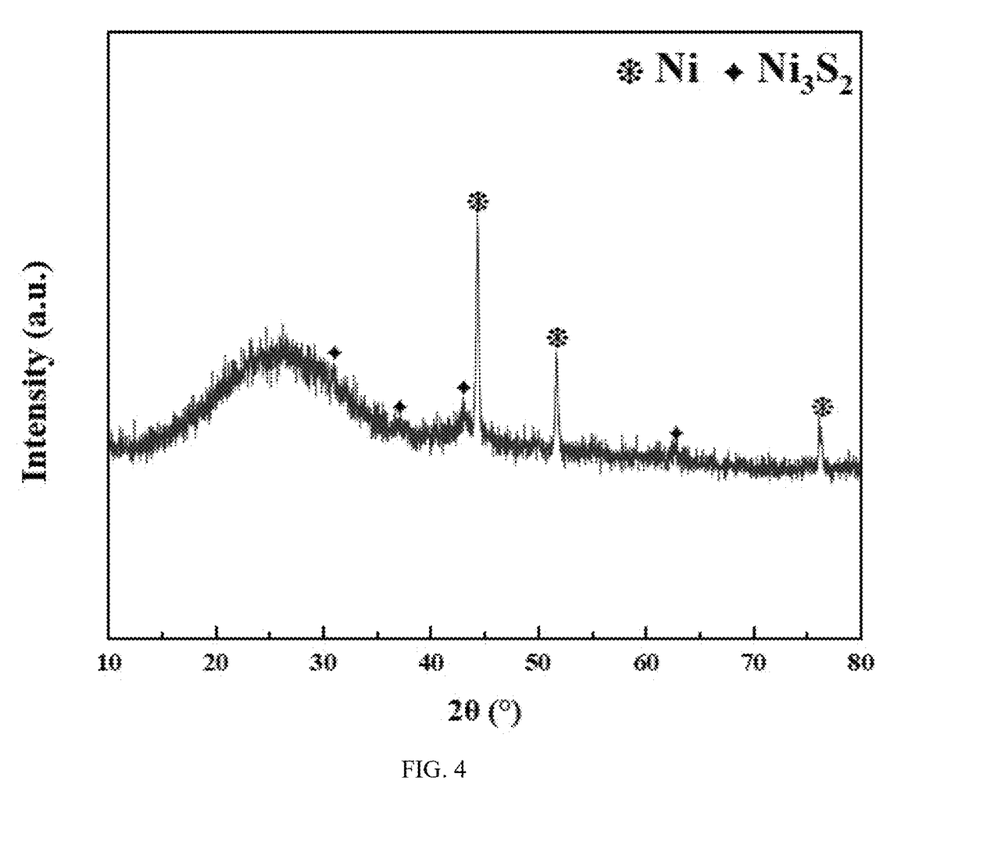
FIG. 4 is X-ray diffraction (XRD) pattern of the porous carbon catalyst loaded with metal sulfides based on high-sulfur petroleum coke prepared in Example 3.

FIG. 4 shows the XRD pattern of the porous carbon catalyst loaded with metal sulfides based on high-sulfur petroleum coke prepared in Example 3, where diffraction peaks corresponding to $Ni_2S_3$ were detected at several positions at 2θ values of 31.1°, 37.1°, 43.2°, 50.1°, and 62.9°.

Table 1 shows that the sulfur conversion rate of the prepared catalyst was 25.11%.

Figure 5:
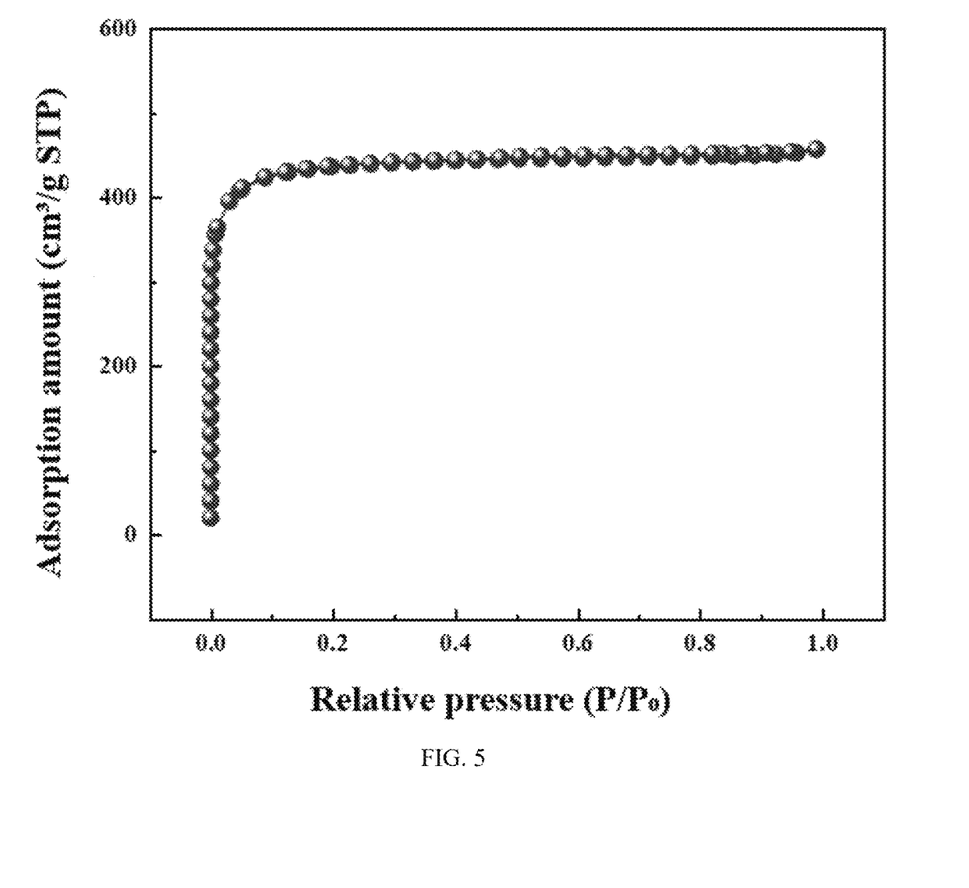
FIG. 5 shows $N_2$ adsorption/desorption isotherms of the porous carbon catalyst loaded with metal sulfides based on high-sulfur petroleum coke prepared in Example 3.

FIG. 5 shows the $N_2$ adsorption/desorption isotherms of the prepared catalyst, which exhibited a typical Type I isotherm. The rapid rise in adsorption at low relative pressures and the adsorption capacity remained stable subsequently. The plateau parallel to the $P/P_o$ axis indicated the microporous nature of the prepared catalyst material. The specific surface area and pore volume were 1289.57 $m^2/g$ and 0.707 $cm^2/g$, respectively.

Comparative Example 1

The difference from Example 3 was that Step 3 used an argon atmosphere at a flow rate of 25 ml/min instead of switching to hydrogen, while all other conditions remained the same as in Example 3.

Comparative Example 2

The difference from Example 3 was that no nickel nitrate hexahydrate was added in Step 1, while all other conditions remained the same as in Example 3.

Comparative Example 3

The differences from Example 3 were that Step 3 used an argon atmosphere instead of switching to hydrogen, and no nickel nitrate hexahydrate was added in Step 1. All other conditions remained the same as in Example 3.

Table 1 shows the total sulfur content and sulfur conversion rates of the catalysts prepared in Examples 1-3 and Comparative Examples 1-3. The method in Example 1 achieved a sulfur conversion rate of 40%. By comparing with the comparative examples, it is evident that both hydrogen and the metal salt precursor play crucial roles in the preparation of the porous carbon catalyst loaded with metal sulfides based on high-sulfur petroleum coke, and neither can be omitted.

TABLE 1

Total sulfur content and sulfur conversion rates of catalysts prepared in Examples 1-3 and Comparative Examples 1-3

| Sample | Total sulfur content (ad %) | Sulfur conversion rate (%) |
|---|---|---|
| Example 1 | 2.96 | 40.00 |
| Example 2 | 2.08 | 28.11 |
| Example 3 | 1.94 | 26.22 |
| Comparative Example 1 | 0.11 | 4.19 |
| Comparative Example 2 | 0.12 | 1.62 |
| Comparative Example 3 | 0.61 | 8.24 |

In Table 1, the total sulfur content refers to the mass percentage of sulfur in the porous carbon catalyst loaded with metal sulfides based on high-sulfur petroleum coke; the sulfur conversion rate refers to the rate at which bulk sulfur atoms in the high-sulfur petroleum coke are in situ converted into transition metal sulfides.

The porous carbon catalyst loaded with metal sulfides based on high-sulfur petroleum coke, prepared in Example 3, was mixed with $MgH_2$ at a mass ratio of 1:10 and ball-milled. The ball-to-material ratio was 40:1, the ball-milling speed was 400 rpm, and the ball-milling time was 5 hours. Under a high-purity argon protective atmosphere, the temperature was increased at a rate of 10° C./min, and the hydrogen desorption peak temperature was measured using differential scanning calorimetry (DSC).

Figure 6:
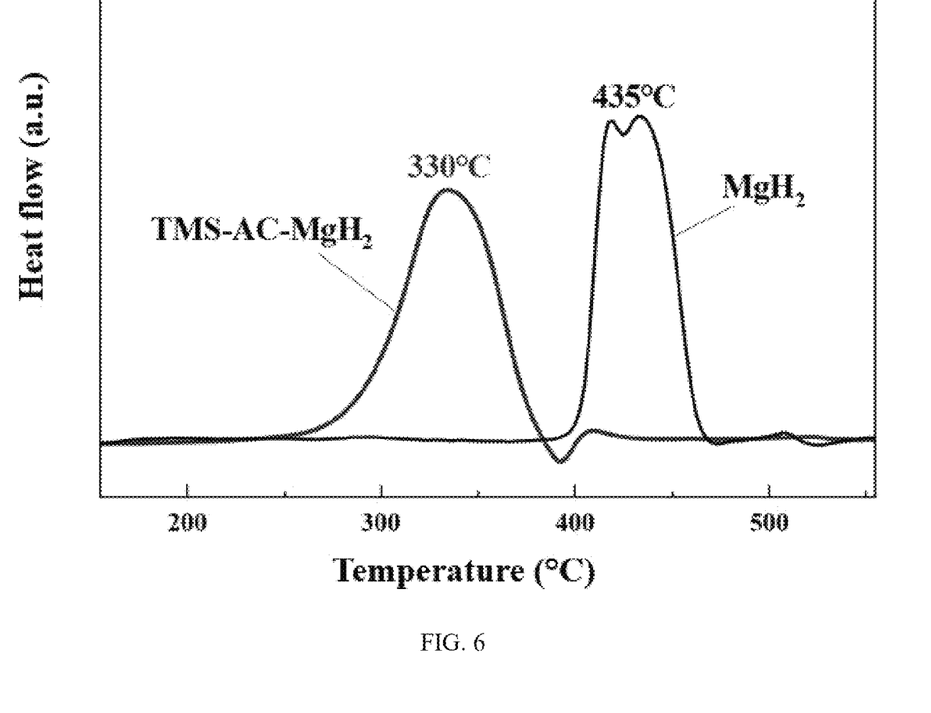
FIG. 6 shows the DSC curve of hydrogen release from $MgH_2$ catalyzed by the porous carbon catalyst loaded with metal sulfides based on high-sulfur petroleum coke, prepared in Example 3.

FIG. 6 shows the hydrogen desorption curve of the composite hydrogen storage material (TMS-AC-$MgH_2$), composed of the porous carbon catalyst loaded with metal sulfides based on high-sulfur petroleum coke and $MgH_2$, prepared in Example 3. The peak hydrogen desorption temperature of the composite hydrogen storage material was 330° C., which is 100° C. lower than that of pure $MgH_2$, indicating significant catalytic activity.

These results demonstrate that the method described in the present invention successfully in situ bonded and converted sulfur in high-sulfur petroleum coke into corresponding transition metal sulfides, achieving the resource utilization of sulfur in high-sulfur petroleum coke. The activation effect of KOH formed a porous structure that allowed the even dispersion of the produced metal sulfide catalyst, effectively improving the hydrogen desorption performance of magnesium hydride.

The above descriptions are merely preferred embodiments of the present invention and are not intended to limit the present invention. For those skilled in the art, various changes and modifications can be made to the present invention. Any modification, equivalent replacement, or improvement made within the spirit and principles of the present invention should be included within the scope of the present invention's protection.

The invention claimed is:

1. A method for preparing a porous carbon catalyst loaded with a transition metal sulfide based on high-sulfur petroleum coke, comprising:
   (1) preparing an in-situ activated precursor:
      mixing a high-sulfur petroleum coke having a content of sulfur of 3-10 wt % with a transition metal salt in an ethanol aqueous solution thoroughly, and then evaporating and drying to obtain the in-situ activated precursor;
      the transition metal of the salt is nickel or niobium;
   (2) destabilizing bulk sulfur:
      grinding and mixing the in-situ activated precursor obtained from step (1) with an alkaline activator in a mass ratio of the alkaline activator to the high-sulfur petroleum coke of (1-5):(1-2), followed by placement in a tube furnace, heating from room temperature to a specified temperature of 600-800° C. at a controlled rate under an argon inert atmosphere, bulk sulfur is destabilized under the joint action of the specified temperature and alkaline activator;
      the alkaline activator is potassium hydroxide or sodium hydroxide;
   (3) conducting an in-situ the transition metal-sulfur bonding reaction:
      maintaining the specified temperature from step (2), switching the argon atmosphere to hydrogen at a flow rate of 10-60 mL/min, and conducting the in-situ the transition metal-sulfur bonding reaction for 1-2 hours, followed by cooling down to room temperature under an argon atmosphere;
   (4) washing and drying:
      washing the product obtained from step (3) with a washing solution, drying and grinding to obtain the porous carbon catalyst loaded with the transition metal sulfide based on high-sulfur petroleum coke.

2. The method according to claim 1, wherein a particle size of the high-sulfur petroleum coke is 110-125 μm.

3. The method according to claim 1, wherein the transition metal salt is selected from at least one of nitrates, sulfates, chlorides, and acetates; and
   a mass ratio of the high-sulfur petroleum coke to the transition metal salt is 1:(0.1-1).

4. The method according to claim 1, wherein the controlled rate is 5-10° C./min.

5. The method according to claim 1, wherein in the step of washing and drying, the washing solution is water, a pH of the product after washing is 6.5-7.5, and the drying is carried out at 60-80° C. for 20-24 hours.

* * * * *